United States Patent
Wang et al.

(10) Patent No.: US 10,222,918 B2
(45) Date of Patent: Mar. 5, 2019

(54) TOUCH SUBSTRATE, TOUCH CONTROL DISPLAY APPARATUS, AND FABRICATING METHOD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiujuan Wang, Beijing (CN); Xianjie Shao, Beijing (CN); Bo Liu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/579,320

(22) PCT Filed: Jun. 14, 2017

(86) PCT No.: PCT/CN2017/088225
§ 371 (c)(1),
(2) Date: Dec. 4, 2017

(87) PCT Pub. No.: WO2018/014679
PCT Pub. Date: Jan. 25, 2018

(65) Prior Publication Data
US 2018/0299985 A1    Oct. 18, 2018

(30) Foreign Application Priority Data

Jul. 21, 2016   (CN) .......................... 2016 1 0580879

(51) Int. Cl.
G06F 3/041    (2006.01)
G06F 3/044    (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2015/0309661 A1   10/2015   Kim et al.
2015/0331530 A1   11/2015   Kim et al.
(Continued)

FOREIGN PATENT DOCUMENTS

CN   104731412 A   6/2015
CN   105022539 A   11/2015
(Continued)

OTHER PUBLICATIONS

International Search Report & Written Opinion dated Aug. 30, 2017, regarding PCT/CN2017/088225.
(Continued)

*Primary Examiner* — Nicholas J Lee
(74) *Attorney, Agent, or Firm* — Intellectual Valley Law, P.C.

(57) ABSTRACT

The present application discloses a self-capacitive touch substrate. The self-capacitive touch substrate includes a base substrate; a plurality gate lines crossing over a plurality of data lines; a plurality of touch electrodes; and a plurality of touch signal lines, each of which is electrically connected to one of the plurality of touch electrodes. The plurality of touch signal lines cross over the plurality of data lines.

16 Claims, 5 Drawing Sheets

(56) References Cited

U.S. PATENT DOCUMENTS

2016/0092029 A1 3/2016 Kim et al.
2016/0291722 A1 10/2016 Du et al.
2017/0147123 A1 5/2017 Wang et al.

FOREIGN PATENT DOCUMENTS

CN 105094422 A 11/2015
CN 105094479 A 11/2015

OTHER PUBLICATIONS

First Office Action in the Chinese Patent Application No. 201610580879.0, dated Dec. 5, 2017; English translation attached.

*Related Art*

TOUCH SUBSTRATE, TOUCH CONTROL DISPLAY APPARATUS, AND FABRICATING METHOD

CROSS-REFERENCE TO RELATED APPLICATION

This application is a national stage application under 35 U.S.C. § 371 of International Application No. PCT/CN2017/088225, filed Jun. 14, 2017, which claims priority to Chinese Patent Application No. 201610580879.0, filed Jul. 21, 2016, the contents of which are incorporated by reference in the entirety.

TECHNICAL FIELD

The present invention relates to touch control technology, more particularly, to a touch substrate, a touch control display apparatus, and a fabricating method.

BACKGROUND

In recent years, touch apparatuses have been widely used in many electronic devices such as mobile phones, computer display panels, touch screens, satellite navigation devices, digital cameras, etc. Examples of touch apparatuses include a mutual capacitive touch control device and a self-capacitive touch control device. In a mutual capacitive touch control device, the touch electrode can be a touch scanning electrode (Tx), whereas the touch sensing electrode (Rx) can be disposed on the color filter substrate. In a self-capacitive touch control device, the touch electrode can achieve touch control function alone.

When a finger of a user performs touch control functions on a touch panel, electrostatic charges accumulate on the touch panel. When the electrostatic charges are transmitted to the touch electrode, the touch control functions may be affected.

SUMMARY

In one aspect, the present invention provides a self-capacitive touch substrate comprising a base substrate; a plurality gate lines crossing over a plurality of data lines; a plurality of touch electrodes; and a plurality of touch signal lines, each of which is electrically connected to one of the plurality of touch electrodes; wherein the plurality of touch signal lines cross over the plurality of data lines.

Optionally, the self-capacitive touch substrate further comprises a matrix of a plurality of subpixels; and parasitic capacitances between a pixel electrode in each of the plurality of subpixels and each of the two data lines of the plurality of data lines adjacent to the pixel electrode are substantially the same.

Optionally, the plurality of touch signal lines are substantially parallel to the plurality of gate lines.

Optionally, the plurality of touch signal lines and the plurality gate lines are in a same layer and comprise a same material.

Optionally, each of the plurality of touch signal lines comprises a plurality of first portions spaced apart from each other in a first layer and a plurality of second portions spaced apart from each other in a second layer; two adjacent second portions of the plurality of second portions are electrically connected by one of the plurality of first portions; and two adjacent first portions of the plurality of first portions are electrically connected by one of the plurality of second portions.

Optionally, the plurality of first portions and the plurality of data lines are in a same layer; and the plurality of second portions and the plurality of gate lines are in a same layer.

Optionally, the self-capacitive touch substrate comprises a first insulating layer between the first layer and the second layer; two adjacent second portions of the plurality of second portions are electrically connected by one of the plurality of first portions respectively through two vias extending through the first insulating layer; and two adjacent first portions of the plurality of first portions are electrically connected by one of the plurality of second portions respectively through two vias extending through the first insulating layer.

Optionally, each of the plurality of touch signal lines comprises one of the plurality of first portions between each pair of two adjacent data lines.

Optionally, a projection of each of the plurality of second portions on the base substrate forms an intersection point with that of at least one of the plurality of first portions; and a projection of each of the plurality of first portions on the base substrate forms an intersection point with that of at least one of the plurality of second portions.

Optionally, each of the plurality of touch signal lines further comprises a plurality of third portions spaced apart from each other in a third layer; and one of the plurality of first portions and one of the plurality of second portions adjacent to each other in each of the plurality of touch signal lines are electrically connected to each other by one of the plurality of third portions.

Optionally, the plurality of third portions and the plurality of touch electrodes are in a same layer and comprise a same material.

Optionally, the self-capacitive touch substrate comprises a first insulating layer between the first layer and the second layer and a second insulating layer between the first layer and the third layer, and each of the plurality of third portions is electrically connected to one of the plurality of first portions through a first via extending through the second insulating layer and electrically connected to one of the plurality of second portions through a second via extending through the first insulating layer and the second insulating layer.

Optionally, the plurality of touch electrodes are operated in a time-division driving mode; the time-division driving mode comprises a touch control mode and a display mode; and the plurality of touch electrodes are common electrodes for applying common voltage signal in the display mode; the plurality of touch electrodes are touch control electrodes for conducting touch signals in the touch control mode.

In another aspect, the present invention provides a touch control display apparatus comprising a self-capacitive touch substrate described herein; and a touch driver integrated circuit electrically connected to the plurality of touch electrodes respectively through the plurality of touch signal lines.

In another aspect, the present invention provides a method of fabricating a self-capacitive touch substrate, comprising forming a plurality gate lines crossing over a plurality of data lines; forming a plurality of touch electrodes; and forming a plurality of touch signal lines, each of which is formed to be electrically connected to one of the plurality of touch electrodes; wherein the plurality of touch signal lines are formed to be substantially parallel to the plurality of gate lines.

Optionally, the plurality gate lines and the plurality of touch signal lines are formed in a same layer and in a single patterning process.

Optionally, forming the plurality of touch signal lines comprises forming a first portion layer comprising a plurality of first portions spaced apart from each other; forming a second portion layer comprising a plurality of second portions spaced apart from each other; electrically connecting two adjacent second portions of the plurality of second portions in one of the plurality of touch signal lines by one of the plurality of first portions in the one of the plurality of touch signal lines; and electrically connecting two adjacent first portions of the plurality of first portions in the one of the plurality of touch signal lines by one of the plurality of second portions in the one of the plurality of touch signal lines.

Optionally, the plurality of first portions and the plurality of data lines are in a same layer and in a single patterning process; and the plurality of second portions and the plurality of gate lines are formed in a same layer and in a single patterning process.

Optionally, forming the plurality of touch signal lines further comprises forming a third portion layer comprising a plurality of third portions spaced apart from each other, and electrically connecting one of the plurality of first portions and one of the plurality of second portions adjacent to each other in each of the plurality of touch signal lines by one of the plurality of third portions.

Optionally, the plurality of third portions and the plurality of touch electrodes are formed in a same layer and in a single patterning process.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
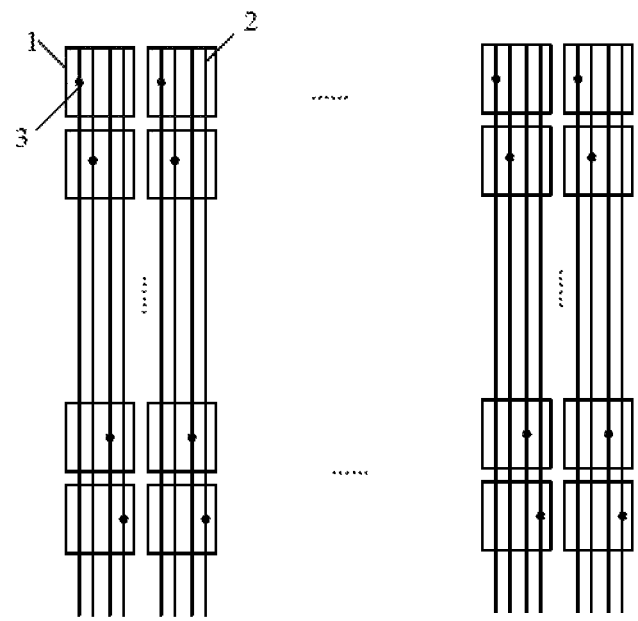
FIG. 1 is a schematic diagram illustrating the structure of a conventional self-capacitive touch substrate.

FIG. 1 is a schematic diagram illustrating the structure of a conventional self-capacitive touch substrate. Referring to FIG. 1, the conventional self-capacitive touch substrate includes a plurality of touch electrodes 1 respectively connected to a plurality of touch signal lines 2. Each of the plurality of touch electrodes 1 in the conventional self-capacitive touch substrate is electrically connected to one of the plurality of touch signal line 2 through a via 3.

Figure 2:
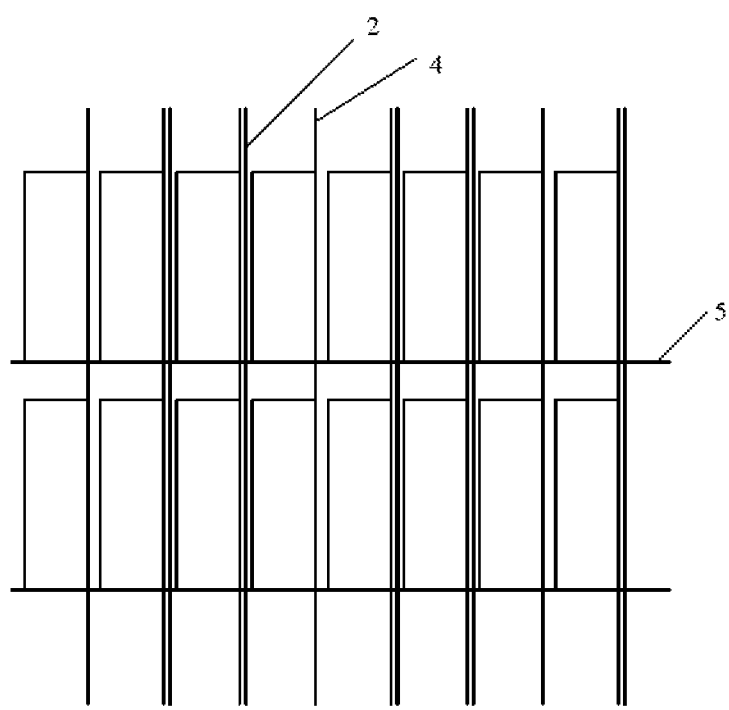
FIG. 2 is a schematic diagram illustrating the structure of a conventional self-capacitive touch substrate having two touch signal lines in every three columns of subpixels.
Figure 3:
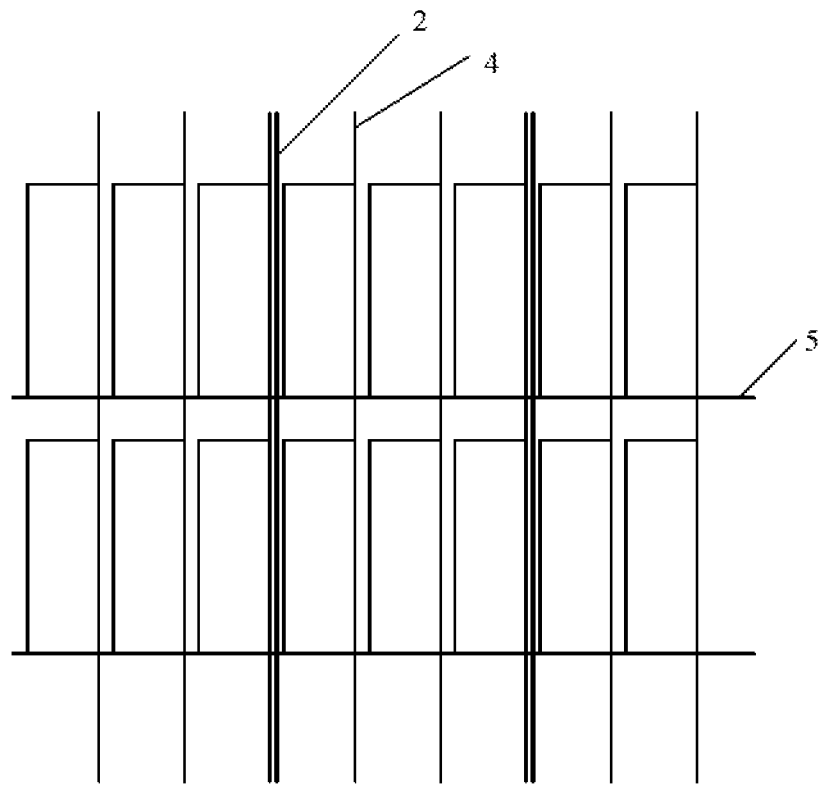
FIG. 3 is a schematic diagram illustrating the structure of a conventional self-capacitive touch substrate having one touch signal line in every three columns of subpixels.

FIG. 2 is a schematic diagram illustrating the structure of a conventional self-capacitive touch substrate having two touch signal lines in every three columns of subpixels. FIG. 3 is a schematic diagram illustrating the structure of a conventional self-capacitive touch substrate having one touch signal line in every three columns of subpixels. Referring to FIG. 2 and FIG. 3, the conventional self-capacitive touch substrate further includes a plurality of data lines 4. The plurality of touch signal lines 2 in the conventional self-capacitive touch substrate are substantially parallel to the plurality of data lines 4. In FIG. 2, the conventional self-capacitive touch substrate has two touch signal lines in every three columns of subpixels. In FIG. 3, the conventional self-capacitive touch substrate has one touch signal line in every three columns of subpixels.

Figure 4:
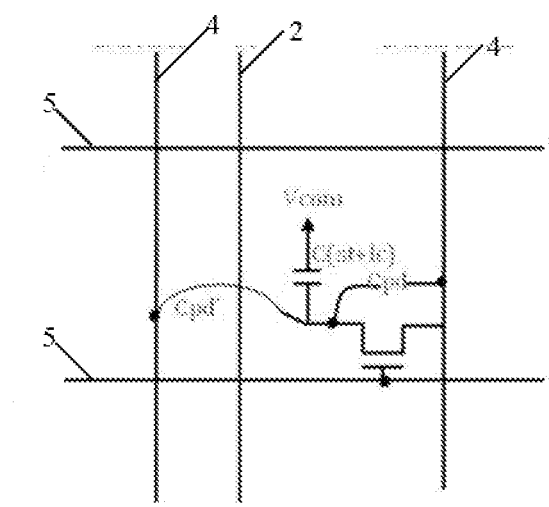
FIG. 4 is a circuit diagram of a conventional self-capacitive touch substrate.

FIG. 4 is a circuit diagram of a conventional self-capacitive touch substrate. Referring to FIG. 4, the plurality of data lines 4 and pixel electrodes form parasitic capacitance when a touch control display apparatus having the self-capacitive touch substrate is in operation. To achieve a uniform display brightness, it is desired that the parasitic capacitances formed between a pixel electrode in each subpixel and each of two adjacent data lines of the plurality of data lines 4 are substantially the same. The layout of the plurality of data lines 4 in the conventional self-capacitive touch substrate is affected by the addition of the plurality of touch signal lines 2 which is parallel to the plurality of data lines 4. For example, a touch signal line is disposed between an (n−1)-th data line and an n-th data line. A pixel electrode in an n-th column of subpixels forms a parasitic capacitance Cpd' with the (n−1)-th data line, and forms a parasitic capacitance Cpd with the n-th data line, Cpd being different from Cpd'. Due to the coupling effect of parasitic capacitance, the voltage change in the data line will be coupled to the pixel electrode. Accordingly, the effect of the (n−1)-th data line on the pixel electrode in an n-th column of subpixels is different from that of the n-th data line, resulting in display brightness non-uniformity and poor display quality.

Accordingly, the present disclosure provides, inter alia, a touch substrate, a touch control display apparatus, and a fabricating method thereof that substantially obviate one or more of the problems due to limitations and disadvantages of the related art. In one aspect, the present disclosure provides a touch substrate. In some embodiments, the touch substrate includes a base substrate; a plurality gate lines crossing over a plurality of data lines; a plurality of touch electrodes; and a plurality of touch signal lines, each of which is electrically connected to one of the plurality of touch electrodes. Optionally, the plurality of touch signal lines cross over the plurality of data lines. Optionally, the plurality of touch signal lines are substantially parallel to the plurality of gate lines. Optionally, the plurality of touch signal lines are substantially orthogonal to the plurality of data lines. Optionally, the touch substrate is a self-capacitive touch substrate.

In some embodiments, the touch substrate further includes a matrix of a plurality of subpixels. Optionally, parasitic capacitances between a pixel electrode in each of the plurality of subpixels and each of the two adjacent data lines of the plurality of data lines adjacent to the pixel electrode are substantially the same. As used herein, the term "substantially the same" refers to parameters (e.g., parasitic capacitances) that are identical, or may be non-identical but fall within the limits of experimental error and experimental variability when considered by one of ordinary skill in the art. The experimental variability of the parasitic capacitance is dependent upon the specific test used and is known to those skilled in the art.

Figure 5:
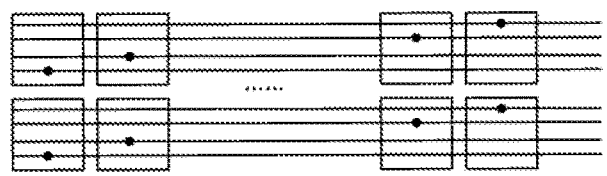
FIG. 5 is a schematic diagram illustrating the structure of a self-capacitive touch substrate in some embodiments according to the present disclosure.
Figure 5:
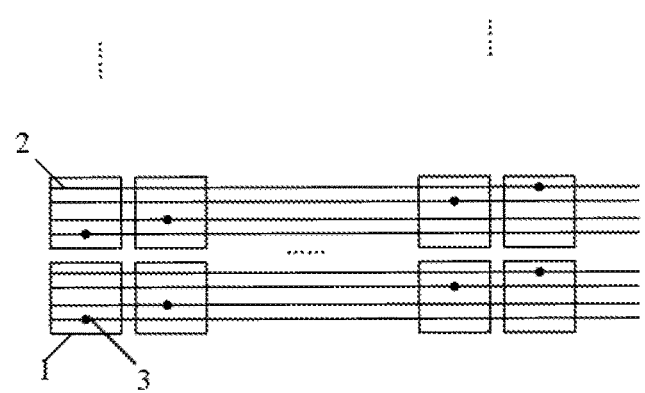
Figure 6:
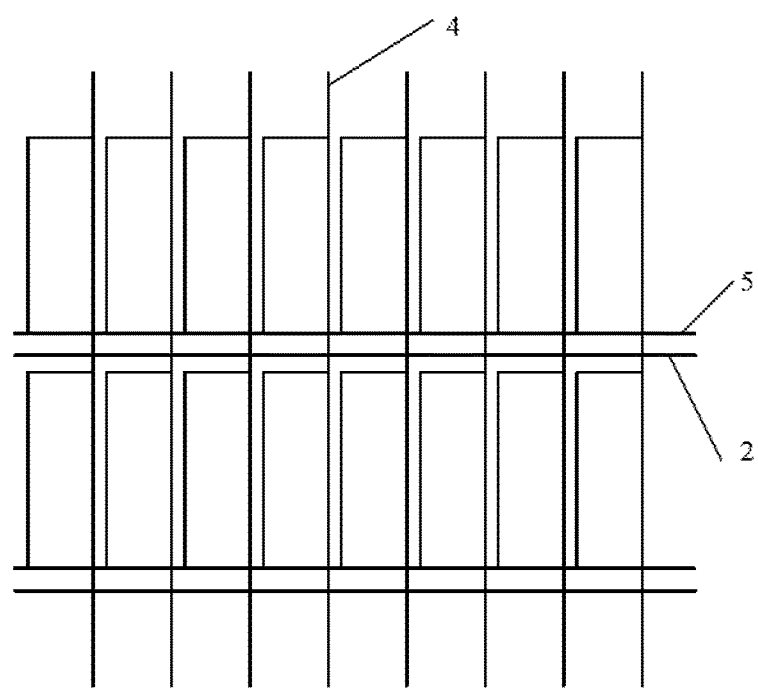
FIG. 6 is a schematic diagram illustrating the pixel structure of a self-capacitive touch substrate in some embodiments according to the present disclosure.

FIG. 5 is a schematic diagram illustrating the structure of a self-capacitive touch substrate in some embodiments according to the present disclosure. FIG. 6 is a schematic diagram illustrating the pixel structure of a self-capacitive touch substrate in some embodiments according to the present disclosure. Referring to FIG. 5 and FIG. 6, the touch substrate in some embodiments includes a plurality of gate lines 5, a plurality of data lines 4 crossing over the plurality of gate lines 5, a plurality of touch electrodes 1, and a plurality of touch signal lines 2. Each of the plurality of touch electrode 3 is electrically connected to one of the plurality of touch signal lines 2 through a via 3. Referring to FIG. 5 and FIG. 6, in stark contrast with the layout in the conventional touch substrate, the plurality of touch signal lines 2 in the present touch substrate cross over the plurality of data lines 4. Optionally, projections of the plurality of touch signal lines 2 on the base substrate are substantially non-overlapping with those of the plurality of gate lines 5, strikingly different from the layout in the conventional touch substrate. Optionally, projections of the plurality of touch signal lines 2 on the base substrate intersect with those of the plurality of data lines 4. Optionally, the plurality of touch signal lines 2 are substantially parallel to the plurality of gate lines 5. Optionally, the plurality of touch signal lines 2 are substantially orthogonal to the plurality of data lines 4. Each of the plurality of touch signal lines 2 is disposed between two adjacent rows of subpixels. Optionally, a ratio of a number of the plurality of gate lines to a number of the plurality of touch signal lines is N:1, N≥1, e.g., the touch substrate includes N gate lines per each touch signal line. Optionally, N=1. Optionally, a ratio of a number of rows of subpixels to a number of the plurality of touch signal lines is M:1, M≥1, e.g., the touch substrate includes N rows of subpixels per each touch signal line. Optionally, M=1. The higher the density of the touch signal lines, the higher the touch control accuracy. In the example as shown in FIG. 6, the touch substrate includes one touch signal line per each row of subpixels.

Figure 8:
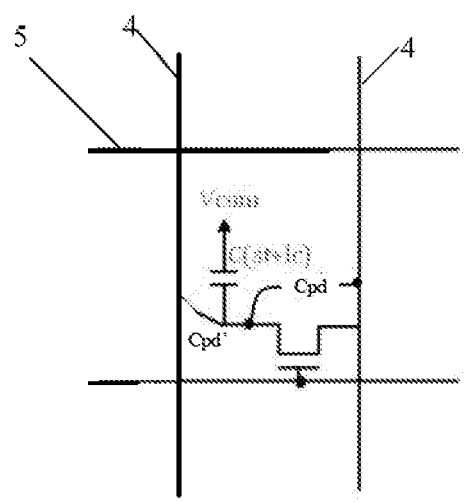
FIG. 8 is a circuit diagram of a self-capacitive touch substrate in some embodiments according to the present disclosure.

In the present touch substrate, the plurality of touch signal lines are substantially parallel to the plurality of gate lines 5. Optionally, the plurality of touch signal lines are substantially orthogonal to the plurality of data lines 4. The layout of the touch signal lines are not related to the data lines and would not affect the layout of the plurality of data lines 4. Accordingly, the layout of the plurality of data lines 4 can be maintained substantially unchanged. For example, the distances between a pixel electrode in each subpixel and each of two adjacent data lines of the plurality of data lines 4 can be maintained substantially the same. FIG. 8 is a circuit diagram of a self-capacitive touch substrate in some embodiments according to the present disclosure. Referring to FIG. 8, because the distances between the pixel electrode in each subpixel and each of two adjacent data lines of the plurality of data lines 4 can be maintained substantially the same, the parasitic capacitances between the pixel electrode in each subpixel and each of the two adjacent data lines of the plurality of data lines 4 adjacent to the pixel electrode, $Cpd'$ and $Cpd$, are substantially the same. When a touch control display apparatus having the present touch substrate is in operation, the effects of the two adjacent data lines of the plurality of data lines 4 respectively on the pixel electrode in each subpixel are substantially the same. As a result, a substantially uniform display brightness can be achieved in the touch control display apparatus, significantly enhancing the display quality.

In some embodiments, the plurality of touch signal lines 2 and the plurality gate lines 5 are in a same layer and made of a same conductive material. By having this design, the fabricating process of the touch substrate can be greatly simplified and manufacturing costs lowered. As used herein, the term "same layer" refers to the relationship between the layers simultaneously formed in the same step. In one example, the plurality of touch signal lines 2 and the plurality gate lines 5 are in a same layer when they are formed as a result of one or more steps of a same patterning process performed in a same layer of material. In another example, the plurality of touch signal lines 2 and the plurality gate lines 5 can be formed in a same layer by simultaneously performing the step of forming the plurality of touch signal lines 2 and the step of forming the plurality gate lines 5. The term "same layer" does not always mean that the thickness of the layer or the height of the layer in a cross-sectional view is the same.

Figure 9:
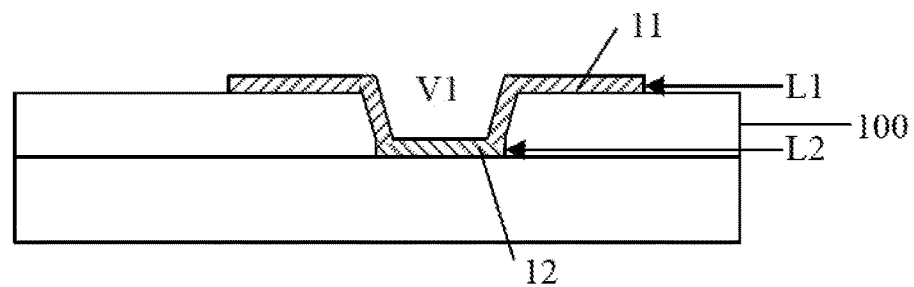
FIG. 9 is a cross-sectional view of a self-capacitive touch substrate having a touch signal line including a first portion and a second portion in some embodiments according to the present disclosure.
Figure 10:
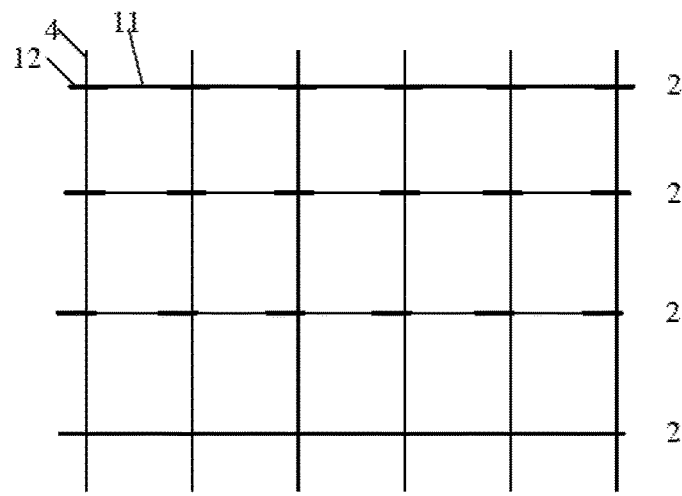
FIG. 10 is a schematic diagram illustrating the structure of touch signal lines having a first portion and a second portion in some embodiments according to the present disclosure.

In some embodiments, each of the plurality of touch signal lines 2 includes a plurality of first portions spaced apart from each other in a first layer and a plurality of second portions spaced apart from each other in a second layer. The second layer is different from the first layer. FIG. 9 is a cross-sectional view of a self-capacitive touch substrate having a touch signal line including a first portion and a second portion in some embodiments according to the present disclosure. FIG. 10 is a schematic diagram illustrating the structure of touch signal lines having a first portion and a second portion in some embodiments according to the present disclosure. Referring to FIG. 9 and FIG. 10, the each of the plurality of touch signal lines 2 includes a plurality of first portions 11 in a first layer L1 and a plurality of second portions 12 in a second layer L2. The plurality of first portions 11 are spaced apart from each other. The plurality of second portions 12 are spaced apart from each other. Two adjacent second portions of the plurality of second portions 12 are electrically connected by one of the plurality of first portions 11. Two adjacent first portions of the plurality of first portions 11 are electrically connected by one of the plurality of second portions 12.

In some embodiments, the first layer L1 is a layer including the plurality of first portions 11 and the plurality of data lines 4, e.g., the plurality of first portions 11 and the plurality of data lines 4 are in a same layer. In some embodiments, the second layer L2 is a layer including the plurality of second portions 12 and the plurality of gate lines 5. Referring to FIG. 9, the touch substrate in some embodiments further includes a first insulating layer 100 between the first layer L1 and the second layer L2. Two adjacent second portions of the plurality of second portions 12 are electrically connected by one of the plurality of first portions 11 respectively through two vias (see, e.g., the via V1 in FIG. 9) extending through the first insulating layer 100. Two adjacent first portions of the plurality of first portions 11 are electrically connected by one of the plurality of second portions respectively through two vias (see, e.g., the via V1 in FIG. 9) extending through the first insulating layer. By having the plurality of first portions 11 and the plurality of data lines 4 in a same layer and made of a same material, and having the plurality of second portions 12 and the plurality of gate lines 5 in a same layer and made of a same material, the fabricating process of the touch substrate can be greatly simplified and manufacturing costs lowered.

Referring to FIG. 9 and FIG. 10, each of the plurality of touch signal lines includes one of the plurality of first portions 11 between each pair of two adjacent data lines 4. Optionally, the plurality of first portions 11 and the plurality of second portions 12 are substantially parallel to the plurality of gate lines 5. Each two adjacent first portions of the plurality of first portions 11 sandwich one of the plurality of second portions 12. Each two adjacent second portions of the plurality of second portions 12 sandwich one of the plurality of first portions 11. Optionally, a projection of each of the plurality of second portions 12 on the base substrate forms an intersection point with that of at least one of the plurality of first portions 11. Optionally, a projection of each of the plurality of first portions 11 on the base substrate forms an intersection point with that of at least one of the plurality of second portions 12.

Figure 11:
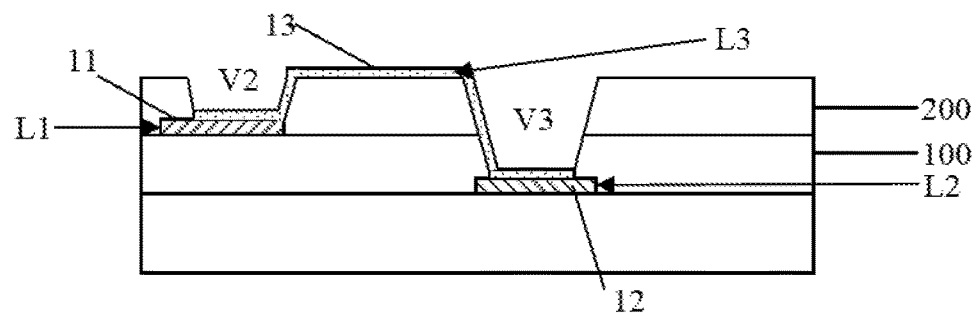
FIG. 11 is a cross-sectional view of a self-capacitive touch substrate having a touch signal line including a first portion, a second portion, and a third portion in some embodiments according to the present disclosure.

FIG. 11 is a cross-sectional view of a self-capacitive touch substrate having a touch signal line including a first portion, a second portion, and a third portion in some embodiments according to the present disclosure. Referring to FIG. 11, each of the plurality of touch signal lines in some embodiments includes a plurality of first portions 11 spaced apart from each other in a first layer L1, a plurality of second portions 12 spaced apart from each other in a second layer L2, and a plurality of third portions 13 spaced apart from each other in a third layer L3. One of the plurality of first portions 11 and one of the plurality of second portions 12 adjacent to each other in each of the plurality of touch signal lines are electrically connected to each other by one of the plurality of third portions 13. The first layer L1, the second layer L2, and the third layer L3 are different from each other.

In some embodiments, the plurality of third portions 13 and the plurality of touch electrodes are in a same layer and made of a same material. Optionally, the plurality of first portions 11 and the plurality of data lines 4 are in a same layer and made of a same material. Optionally, the plurality of second portions 12 and the plurality of gate lines 5 are in a same layer and made of a same material. By having this design, the fabricating process of the touch substrate can be greatly simplified and manufacturing costs lowered.

Referring to FIG. 11, the touch substrate in some embodiments includes a first insulating layer 100 between the first layer L1 and the second layer L2, and a second insulating layer 200 between the first layer L1 and the third layer L3. Optionally, each of the plurality of third portions 13 is electrically connected to one of the plurality of first portions 11 through a first via (see, e.g., the via V2 in FIG. 11) extending through the second insulating layer 200 and electrically connected to one of the plurality of second portions 12 through a second via (see, e.g., the via V3 in FIG. 11) extending through the first insulating layer 100 and the second insulating layer 200.

In some embodiments, the plurality of touch electrodes are operated in a time-division driving mode. Optionally, the time-division driving mode includes a touch control mode and a display mode. In the display mode, the plurality of touch electrodes are common electrodes for applying common voltage signal. In the touch control mode, the plurality of touch electrodes are touch control electrodes for conducting touch signals.

In another aspect, the present disclosure provides a touch control display apparatus. In some embodiments, the touch control display apparatus includes a touch substrate described herein, and a touch driver integrated circuit electrically connected to the plurality of touch electrodes respectively through the plurality of touch signal lines. The plurality of touch signal lines are configured to transmit a touch scanning signal from the touch driver integrated circuit to the plurality of touch electrodes, and configured to transmit a touch sensing signal to the touch driver integrated circuit from a touch electrode where a touch event occurs.

Optionally, the touch driver integrated circuit are integrated with a gate driver integrated circuit. One driver integrated circuit can be utilized for transmitting touch control signals, receiving touch sensing signals, as well as transmitting gate driving signals. By having this design, the number of driver integrated circuits in the touch control display apparatus can be minimized. Optionally, the driver integrated circuit is a chip-on-glass driver integrated circuit.

Figure 7:
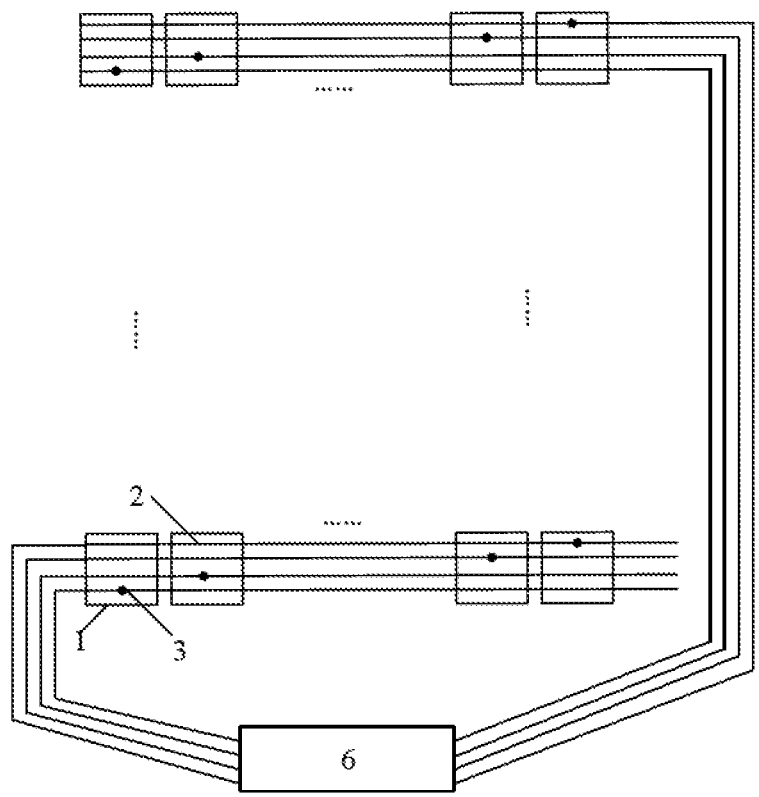
FIG. 7 is a schematic diagram illustrating electrical connection between touch signal lines and a touch driver integrated circuit in a touch control display apparatus in some embodiments according to the present disclosure.

In some embodiments, the touch control display apparatus is a gate-driver-on-array (GOA) type apparatus. FIG. 7 is a schematic diagram illustrating electrical connection between touch signal lines and a touch driver integrated circuit in a touch control display apparatus in some embodiments according to the present disclosure. Referring to FIG. 7, the plurality of touch signal lines 2 extend from the touch substrate (e.g., from two sides of the touch substrate), and are electrically connected to a GOA unit 6.

In some embodiments, the touch substrate is operated in a time-division driving mode. Optionally, the time-division driving mode includes a touch control mode and a display mode. In the display mode, the GOA unit 6 provides gate scanning signals in the display mode to a plurality of gate lines in the touch substrate. In the touch control mode, the GOA unit 6 provides touch control signals to the plurality of touch electrodes, and receives touch sensing signals from a touch electrode where a touch event occurs.

In another aspect, the present disclosure provides a method of fabricating a self-capacitive touch substrate. In some embodiments, the method includes forming a plurality gate lines crossing over a plurality of data lines; forming a plurality of touch electrodes; and forming a plurality of touch signal lines, each of which is formed to be electrically connected to one of the plurality of touch electrodes. Optionally, the plurality of touch signal lines are formed to be substantially parallel to the plurality of gate lines. By forming the plurality of touch signal lines substantially parallel to the plurality of gate lines, the layout of the plurality of touch signal lines would not affect the layout of the plurality of data lines. Accordingly, the parasitic capacitances between the pixel electrode in each subpixel and each of the two data lines of the plurality of data lines 4 adjacent to the pixel electrode can be maintained substantially the same. When a touch control display apparatus having the present touch substrate is in operation, the effects of the two adjacent data lines of the plurality of data lines respectively on the pixel electrode in each subpixel are substantially the same. As a result, a substantially uniform display brightness can be achieved in the touch control display apparatus, significantly enhancing the display quality.

Optionally, a ratio of a number of the plurality of gate lines to a number of the plurality of touch signal lines is N:1, N≥1. Optionally, N=1.

In some embodiments, the plurality gate lines and the plurality of touch signal lines are formed in a same layer, in a single patterning process (e.g., with a single mask plate), and using a same material. By having the plurality gate lines and the plurality of touch signal lines formed in a single patterning process, the fabricating process of the touch substrate can be greatly simplified and manufacturing costs lowered.

In some embodiments, the step of forming the plurality of touch signal lines includes forming a first portion layer including a plurality of first portions spaced apart from each other; and forming a second portion layer including a plurality of second portions spaced apart from each other. Optionally, the step of forming the plurality of touch signal lines further includes electrically connecting two adjacent second portions of the plurality of second portions in one of the plurality of touch signal lines by one of the plurality of first portions in the one of the plurality of touch signal lines; and electrically connecting two adjacent first portions of the plurality of first portions in the one of the plurality of touch signal lines by one of the plurality of second portions in the one of the plurality of touch signal lines. Optionally, the plurality of first portions and the plurality of second portions are formed to be substantially parallel to the plurality of gate lines.

Optionally, the plurality of first portions and the plurality of data lines are formed in a same layer, in a single patterning process (e.g., with a single mask plate), and using a same material. Optionally, the plurality of second portions and the plurality of gate lines are formed in a same layer, in a single patterning process (e.g., with a single mask plate), and using a same material. By having the plurality of first portions and the plurality of data lines formed in a single patterning process, and the plurality of second portions and the plurality of gate lines are formed in a single patterning process, the fabricating process of the touch substrate can be greatly simplified and manufacturing costs lowered.

In some embodiments, the method further includes forming a first insulating layer between the first layer and the second layer. Optionally, the method further includes forming a plurality of vias extending through the first insulating layer, thereby electrically connecting two adjacent second portions of the plurality of second portions by one of the plurality of first portions respectively through two vias extending through the first insulating layer, and electrically connecting two adjacent first portions of the plurality of first portions by one of the plurality of second portions respectively through two vias extending through the first insulating layer. Optionally, each of the plurality of touch signal lines is formed so that each of the plurality of first portions is formed between each pair of two adjacent data lines. Optionally, each of the plurality of touch signal lines is formed so that a projection of each of the plurality of second portions on the base substrate forms an intersection point with that of at least one of the plurality of first portions; and a projection of each of the plurality of first portions on the base substrate forms an intersection point with that of at least one of the plurality of second portions.

In some embodiments, the step of forming the plurality of touch signal lines includes forming a first portion layer including a plurality of first portions spaced apart from each other forming a second portion layer including a plurality of second portions spaced apart from each other; and forming a third portion layer including a plurality of third portions spaced apart from each other in a third layer. Optionally, the step further includes electrically connecting one of the plurality of first portions and one of the plurality of second portions adjacent to each other in each of the plurality of touch signal lines by one of the plurality of third portions.

Optionally, the plurality of third portions and the plurality of touch electrodes are formed in a same layer, in a single patterning process (e.g., with a single mask plate), and using a same material. By having the plurality of third portions and the plurality of touch electrodes formed in a single patterning process, the fabricating process of the touch substrate can be greatly simplified and manufacturing costs lowered.

In some embodiments, the method further includes forming a first insulating layer between the first layer and the second layer, and forming a second insulating layer between the first layer and the third layer. Optionally, the method further includes forming a plurality of first vias extending through the second insulating layer thereby electrically connecting each of the plurality of third portions by one of the plurality of first portions through a first via extending through the second insulating layer. Optionally, the method further includes forming a plurality of second vias extending through the first insulating layer and the second insulating layer thereby electrically connecting each of the plurality of third portions by one of the plurality of second portions through a second via extending through the first insulating layer and the second insulating layer The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A self-capacitive touch substrate, comprising:
a base substrate;
a plurality gate lines crossing over a plurality of data lines;
a plurality of touch electrodes; and
a plurality of touch signal lines, each of which is electrically connected to one of the plurality of touch electrodes;
wherein the plurality of touch signal lines cross over the plurality of data lines;
each of the plurality of touch signal lines comprises a plurality of first portions spaced apart from each other in a first layer and a plurality of second portions spaced apart from each other in a second layer;
two adjacent second portions of the plurality of second portions are electrically connected by one of the plurality of first portions;
two adjacent first portions of the plurality of first portions are electrically connected by one of the plurality of second portions;
each of the plurality of touch signal lines further comprises a plurality of third portions spaced apart from each other in a third layer; and
one of the plurality of first portions and one of the plurality of second portions adjacent to each other in each of the plurality of touch signal lines are electrically connected to each other by one of the plurality of third portions.

2. The self-capacitive touch substrate of claim 1, wherein the self-capacitive touch substrate further comprises a matrix of a plurality of subpixels; and
parasitic capacitances between a pixel electrode in each of the plurality of subpixels and each of the two data lines of the plurality of data lines adjacent to the pixel electrode are substantially the same.

3. The self-capacitive touch substrate of claim 1, wherein the plurality of touch signal lines are substantially parallel to the plurality of gate lines.

4. The self-capacitive touch substrate of claim 1, wherein the plurality of touch signal lines and the plurality gate lines are in a same layer and comprise a same material.

5. The self-capacitive touch substrate of claim 1, wherein the plurality of first portions and the plurality of data lines are in a same layer; and
the plurality of second portions and the plurality of gate lines are in a same layer.

6. The self-capacitive touch substrate of claim 1, wherein the self-capacitive touch substrate comprises a first insulating layer between the first layer and the second layer;
two adjacent second portions of the plurality of second portions are electrically connected by one of the plurality of first portions respectively through two vias extending through the first insulating layer; and
two adjacent first portions of the plurality of first portions are electrically connected by one of the plurality of second portions respectively through two vias extending through the first insulating layer.

7. The self-capacitive touch substrate of claim 1, wherein each of the plurality of touch signal lines comprises one of the plurality of first portions between each pair of two adjacent data lines.

8. The self-capacitive touch substrate of claim 1, wherein a projection of each of the plurality of second portions on the base substrate forms an intersection point with that of at least one of the plurality of first portions; and
a projection of each of the plurality of first portions on the base substrate forms an intersection point with that of at least one of the plurality of second portions.

9. The self-capacitive touch substrate of claim 1, wherein the plurality of third portions and the plurality of touch electrodes are in a same layer and comprise a same material.

10. The self-capacitive touch substrate of claim 1, wherein the self-capacitive touch substrate comprises a first insulating layer between the first layer and the second layer and a second insulating layer between the first layer and the third layer; and
each of the plurality of third portions is electrically connected to one of the plurality of first portions through a first via extending through the second insulating layer and electrically connected to one of the plurality of second portions through a second via extending through the first insulating layer and the second insulating layer.

11. The self-capacitive touch substrate of claim 1, wherein the plurality of touch electrodes are operated in a time-division driving mode;
the time-division driving mode comprises a touch control mode and a display mode;
the plurality of touch electrodes are common electrodes for applying common voltage signal in the display mode; the plurality of touch electrodes are touch control electrodes for conducting touch signals in the touch control mode.

12. A touch control display apparatus, comprising the self-capacitive touch substrate of claim 1; and
a touch driver integrated circuit electrically connected to the plurality of touch electrodes respectively through the plurality of touch signal lines.

13. A method of fabricating a self-capacitive touch substrate, comprising:
forming a plurality gate lines crossing over a plurality of data lines;
forming a plurality of touch electrodes; and
forming a plurality of touch signal lines, each of which is formed to be electrically connected to one of the plurality of touch electrodes;
wherein the plurality of touch signal lines are formed to be substantially parallel to the plurality of gate lines;
wherein forming the plurality of touch signal lines comprises:
forming a first portion layer comprising a plurality of first portions spaced apart from each other;
forming a second portion layer comprising a plurality of second portions spaced apart from each other;
electrically connecting two adjacent second portions of the plurality of second portions in one of the plurality of touch signal lines by one of the plurality of first portions in the one of the plurality of touch signal lines; and
electrically connecting two adjacent first portions of the plurality of first portions in the one of the plurality of touch signal lines by one of the plurality of second portions in the one of the plurality of touch signal lines;
wherein forming the plurality of touch signal lines further comprises:
forming a third portion layer comprising a plurality of third portions spaced apart from each other; and
electrically connecting one of the plurality of first portions and one of the plurality of second portions adjacent to each other in each of the plurality of touch signal lines by one of the plurality of third portions.

14. The method of claim 13, wherein the plurality gate lines and the plurality of touch signal lines are formed in a same layer and in a single patterning process.

15. The method of claim 13, wherein the plurality of first portions and the plurality of data lines are in a same layer and in a single patterning process; and the plurality of second portions and the plurality of gate lines are formed in a same layer and in a single patterning process.

16. The method of claim 13, wherein the plurality of third portions and the plurality of touch electrodes are formed in a same layer and in a single patterning process.

* * * * *